May 3, 1927. 1,627,083
K. G. FRASER
FILTER FUNNEL
Filed Jan. 26, 1921 2 Sheets-Sheet 1
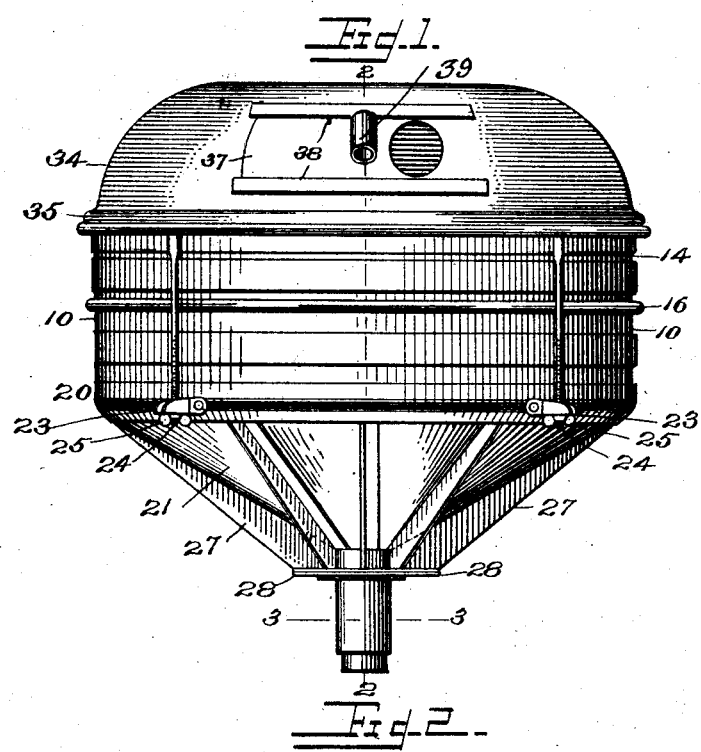
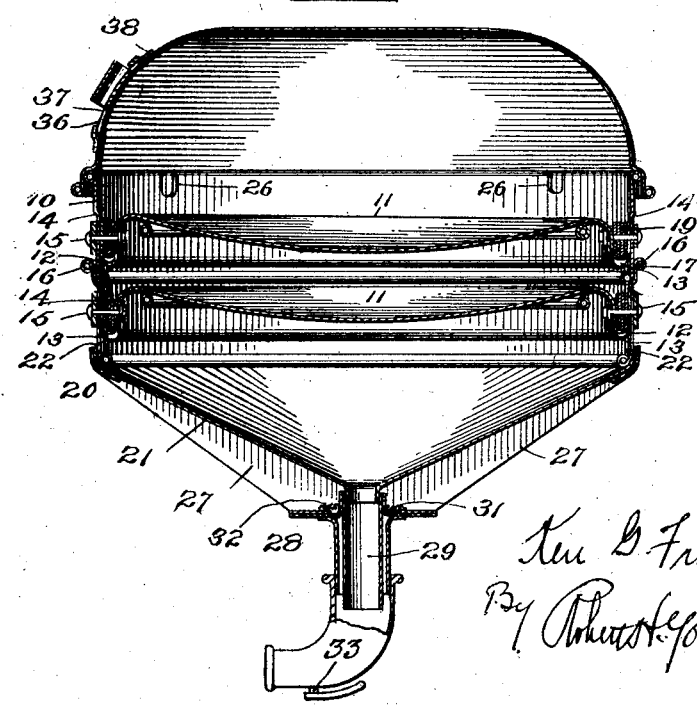

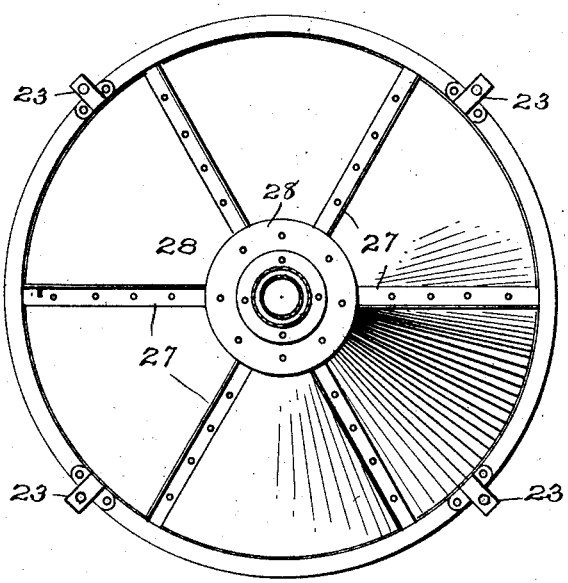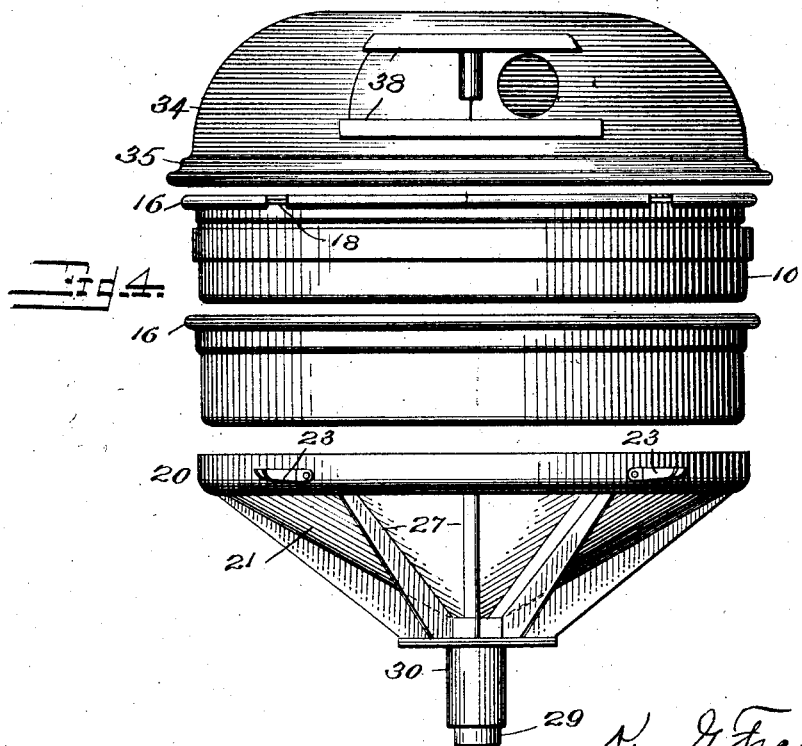

Patented May 3, 1927.

1,627,083

UNITED STATES PATENT OFFICE.

KENNETH G. FRASER, OF WELLTON, ARIZONA.

FILTER FUNNEL.

Application filed January 26, 1921. Serial No. 440,197.

My invention relates to filter funnels and in particular to a funnel of this type which is peculiarly adapted for use in handling highly combustible liquids, such as gasoline and the like.

It is the primary object of the invention to provide a funnel which is of such construction that the combustible liquid, or any gas evolved thereby, can not become ignited by charges of static electricity generated within the funnel. This object is accomplished by preventing sparking between internal metallic parts of the funnel. I propose to construct the funnel in such a manner that the filtering element, which is customarily made of chamois skin or other dielectric material, will not intervene between metallic parts and act as an insulator. In my funnel the body is made of metal from inlet to outlet and presents an uninterrupted and continuous electrical conductor from the inlet past the filtering element to the outlet or discharge end of the funnel. Any static charges which are produced in the funnel above the filtering element may therefore find a path of conduction through the metallic body into the tank or other receptacle with which the funnel comes into contact in use.

A further object of the invention is to provide a filter funnel of such construction that one or more filtering elements may be mounted in the body of the funnel in fixed position spaced from each other and from the discharge end of the funnel so that the filtering elements can not sag and touch each other or the discharge end of the funnel, whereby a decrease in their effective percolation area would result.

Another object is to provide a filter funnel having means for preventing the entrance of dust into the interior of the funnel body while liquid is being introduced. The funnel is adapted to be served with a hose through a small aperture in a cover which is mounted on the inlet end of the funnel and excludes blown dust from the top of the funnel, wherein it would settle on and clog the top filtering element. In addition, this cover prevents the liquid entering the funnel from being blown and dissipated by the wind.

It is an object also to provide a bottom rest in the form of an annular flange surrounding the outlet which is adapted to support the funnel on the tank or container being served and which will contact with the rim of the filler hole in the tank and thus exclude dust from the latter. The funnel is therefore self-sustaining and in effect a dust-proof closure for the filler hole while applied thereto.

A further object is to provide a funnel having efficient means for permitting escape of air from the tank being served. This is accomplished by providing an air vent in the mechanical construction of the funnel, which consists of a pipe concentric to and surrounding the same with one or more ports opening into the atmosphere above the bottom rest.

A still further object is to provide a filter funnel comprising a plurality of demountable parts which may include one or more filtering elements and which may be assembled or disassembled readily to facilitate the replacement of parts in case of wear or breakage, or to aid in packing for shipment or storage.

In general, it is my purpose to provide a filter funnel that will insure the safe and economical delivery of clean, uncontaminated gasoline, oil, chemicals, or the like, with the greatest possible speed.

Other objects may appear as the following specification is read in conjunction with the accompanying drawings, in which:

Fig. 1 is a side elevation of the device showing the hose opening in the cover open;

Fig. 2 is a vertical sectional view on line 2—2 of Fig. 1;

Fig. 3 is a transverse sectional view on the line 3—3 of Fig. 2; and

Fig. 4 is a side elevation showing the filtering elements disconnected and separated slightly from each other and from the cover and base.

In the drawings I have disclosed a filter funnel having two filtering elements mounted in superimposed relation between the base and cover of the device, but it is to be understood that only one, or more than two filtering elements may be employed without departing from the scope of the invention.

Each filtering element consists preferably of an annular side wall 10 of suitable metal, a filter proper 11 of chamois skin or other desired material, and means for supporting the filter 11 in fixed position within the wall 10. The supporting means for the filter proper may consist of a metallic ring 12, pressed into such form that it presents a groove 13, and an annular wooden filler 14, which is adapted to fit within the groove and the ring to bind the marginal edges of the filter therein. The supporting ring is adapted to be mounted inside the side wall 10 midway between its upper and lower edges and may be secured fixedly in this position by any suitable means. However, I find it convenient to employ a plurality of radial bolts 15 for this purpose. These bolts extend through registering apertures in the side wall, supporting ring, wooden filler and filter proper.

At least one filtering element used in each funnel preferably has the upper edge of its side wall provided with an out-turned bead 16 enclosing a wire 17. The bead has portions cut away at relatively spaced points around its periphery to expose short sections 18 of the wire for a purpose which will be described presently.

In order that the several filtering elements may be nested in superimposed relation in the manner shown particularly in Fig. 2 of the drawings, with the filter proper of each filtering element spaced vertically from the adjoining filter, or filters, the upper portion of the side wall of each filtering element may be expanded slightly so that the lower portion of the side wall of another filtering element may fit therein and rest upon the narrow shoulder 19 thus formed.

The filtering element which is to form part of a filter funnel, or a set of these elements, may be mounted upon a base 20. This base preferably has a downwardly converging frusto-conical bottom wall 21 and a side wall 22 rising from the bottom wall and adapted to have the bottom edge of the filtering element, or the lowermost one of a set of filtering elements, fitted therein. At the marginal edges of the base a plurality of perforated brackets 23 are mounted and clamping members 24 in the form of screw-threaded rods, or the like, extend through the perforations in the respective brackets. Wing-nuts 25 are preferably threaded onto the lower ends of the clamping members beneath the brackets. The upper ends of the clamping members are provided with hooks 26 (see Fig. 2) for engagement with the exposed sections 18 of the bead wire of the filter element. In case more than one filtering element is used in the funnel, at least that element which is mounted at the top of the series of filtering elements should have the bead wire with exposed sections just mentioned. By adjusting the wing-nuts 25, the filtering element, or elements, may be clamped securely together and to the base, whereby fluid-tight joints are provided between the filtering element and the base, and between filtering elements when a plurality are employed.

While one specific form of clamping means is disclosed, it is obvious that some other suitable clamping device may be resorted to in practice. I do not limit myself necessarily to any particular type.

Upon reference to Fig. 2, it will be noted that the chamois filters are all maintained in spaced relation to each other, and the bottom filter is spaced from the bottom wall of the funnel base. This feature prevents the effective percolation area of any filter from being reduced by contact with another filter or with the bottom wall of the base, as would be possible in case the filters were allowed to sag or were not maintained in fixed position within the body of the funnel.

In order to reinforce the bottom wall of the funnel base, it may be buttressed by means of the radial ribs 27. A bottom rest for the funnel may be provided by securing an annular plate 28 to the ribs 27 at the center of the base. A discharge pipe 29 preferably extends through the plate 28 from the interior of the base to a point below the said plate sufficiently spaced therefrom for penetration through the filler hole of the tank or other receptacle which may be served by the funnel. When the funnel is used in this manner, the bottom rest will bear against the edges of the filler hole and thus effectively seal the latter against entrance of wind-blown dust or other foreign matter, while functioning additionally as means for supporting the funnel rigidly on the tank.

For the purpose of permitting escape of air from the tank while it is being served I have provided an air escape pipe 30 surrounding the discharge pipe 29 in spaced relation thereto and connected with the funnel base in such a manner that it does not communicate with the interior of the funnel. Air vents 31 may be provided in the bottom rest in communication with the annular air channel between the discharge pipe 29 and the air escape pipe 30. These vents open to the atmosphere above the bottom rest and may be protected against entrance of dust or the like by means of a wire screen 32.

The air escape pipe 30 may be in the form of a flexible metal hose with a stop-cock 33 brazed on it as a gooseneck, as shown in Fig. 2.

The cover 34 for the funnel has a flared lower edge 35 adapted to fit the upper edge of the filter element, or upper-most element of a series. This cover has in one side a filler hole 36 of just sufficient size to permit the insertion of a serving hose, and a sliding closure 37 for this hole is mounted in guides 38 and has a manipulating handle 39. When this closure is in its closed position dust can not enter the funnel, and, also, when the filler hole has a hose extending into the same during the act of serving the funnel, dust can not enter, nor can the gasoline be blown and dissipated by the wind.

It will be observed that, when the various elements of the funnel are joined in the manner indicated in Figs. 1 and 2, the metallic walls are united to form a continuous and uninterrupted electrical conductor from the top to the bottom of the funnel. As a result, any static charges generated within the funnel may find a path of conduction around the filter proper and into the metallic tank on which the funnel may be mounted.

Referring to Fig. 4, it should be apparent that the various parts of the funnel may be separated readily for the purpose of cleaning the same, or in order to replace parts in case of wear or breakage. The parts may be disassembled also for convenience in packing for shipment or storage.

While it is preferable that the metallic parts of the funnel be made of copper or brass, any other metal which is a good conductor of electricity and is suitable in other respects may be used.

I claim:

1. In a filter funnel, a filter body having an inlet and an outlet, a filter disposed within said body, a cover for the inlet having a filler hole therein, a cover for said filler hole, said body having a frusto conical bottom provided with a discharge opening in its apex, a rest for the body in the form of an annular plate surrounding said discharge opening, radial reinforcement ribs provided on the bottom of said body and interposed between same and said rest member.

2. In a filter funnel, a bottom member having a frusto conical form with a discharge outlet in its apex, a combined rest and vent for the funnel comprising a horizontal annular plate spaced from the discharge outlet and secured to the bottom member by radial ribs, the vent being covered by a screening, a series of filter elements having outer rims which are adapted to be nested together, a cover having a filler hole therein, a closure for said filler hole mounted on said cover, and clamping means on the cover and bottom member for securing the filter elements between them.

In testimony whereof I have affixed my signature.

KEN G. FRASER.